US012454716B2

(12) United States Patent
Polyakov et al.

(10) Patent No.: US 12,454,716 B2
(45) Date of Patent: Oct. 28, 2025

(54) BIOLUMINESCENT SINGLE PHOTON BIOREACTOR AND PERFORMING ABSOLUTE QUANTIFICATION OF LIGHT-PRODUCING ACTIVITY BY ENZYMES

(71) Applicant: Government of the United States of America, as represented by the Secretary of Commerce, Gaithersburg, MD (US)

(72) Inventors: Sergey Vladimirovich Polyakov, Gaithersburg, MD (US); Ralph Jimenez, Boulder, CO (US)

(73) Assignee: Government of the United States of America, as represented by Secretary of Commerce, Gaithersburg, MD (US)

( * ) Notice: Subject to any disclaimer, the term of this patent is extended or adjusted under 35 U.S.C. 154(b) by 1032 days.

(21) Appl. No.: 17/515,832

(22) Filed: Nov. 1, 2021

(65) Prior Publication Data

US 2022/0364144 A1    Nov. 17, 2022

Related U.S. Application Data

(60) Provisional application No. 63/186,372, filed on May 10, 2021.

(51) Int. Cl.
*C12Q 1/66* (2006.01)
*B01L 3/00* (2006.01)
*C12N 11/14* (2006.01)
*G01N 21/76* (2006.01)

(52) U.S. Cl.
CPC ............ *C12Q 1/66* (2013.01); *B01L 3/502* (2013.01); *B01L 3/508* (2013.01); *C12N 11/14* (2013.01); *C12Y 113/12013* (2013.01); *G01N 21/763* (2013.01); *B01L 2200/026* (2013.01); *B01L 2300/023* (2013.01); *B01L 2300/0654* (2013.01); *B01L 2300/0663* (2013.01)

(58) Field of Classification Search
CPC . C12Q 1/66; B01L 3/502; B01L 3/508; B01L 2200/026; B01L 2300/023; B01L 2300/0654; B01L 2300/0663; B01L 2300/0877; C12N 11/14; C12Y 113/12013; G01N 21/763
See application file for complete search history.

(56) References Cited

U.S. PATENT DOCUMENTS

2005/0002028 A1* 1/2005 Kasapi ............... G01R 31/311
356/416
2018/0031484 A1* 2/2018 Willson ................ G01N 33/66

* cited by examiner

*Primary Examiner* — Samuel P Siefke
(74) *Attorney, Agent, or Firm* — Office of Chief Counsel for National Institute of Standards and Technology

(57) ABSTRACT

A bioluminescent single photon bioreactor for performing absolute quantification of light-producing activity by enzymes includes: a bioreactor that produces a bio-electronic signal; an electronic sensor that receives the bio-electronic signal and produces an electrical transduction signal; and an analyzer that receives the electrical transduction signal and absolutely quantifies light-producing activity by enzymes from the electrical transduction signal, such that the absolute quantification is accomplished quantum mechanically by determination of a second order autocorrelation function.

12 Claims, 10 Drawing Sheets

(A)

(B)

(A) 216

(B) 216

BIOLUMINESCENT SINGLE PHOTON BIOREACTOR AND PERFORMING ABSOLUTE QUANTIFICATION OF LIGHT-PRODUCING ACTIVITY BY ENZYMES

CROSS REFERENCE TO RELATED APPLICATIONS

This application claims the benefit of U.S. Provisional Patent Application Ser. No. 63/186,372 (filed May 10, 2021), which is herein incorporated by reference in its entirety.

STATEMENT REGARDING FEDERALLY SPONSORED RESEARCH

This invention was made with United States Government support from the National Institute of Standards and Technology (NIST), an agency of the United States Department of Commerce. The Government has certain rights in the invention.

BRIEF DESCRIPTION

Disclosed is a method implemented by a system of one or more processors, the system being included in a bioluminescent single photon bioreactor and for performing absolute quantification of light-producing activity by enzymes by the bioluminescent single photon bioreactor, the method comprising: producing, by a pixel detector of the bioluminescent single photon bioreactor, a detector signal; receiving, by an analyzer of the bioluminescent single photon bioreactor, the detector signal; determining, by the bioluminescent single photon bioreactor, a time of arrival of the detector signal; determining, by the bioluminescent single photon bioreactor, an autocorrelation among detector signals for threshold times of arrival of photons at pixel detector according to: the following equation for a single emitter in the field of view of an objective of the bioluminescent single photon bioreactor:

$$g^{(2)}(\tau) = 1 - e^{-\frac{\tau}{T}},$$

or $g^{(2)}(0)$ for the number of emitters N in the field of view (FOV) of the objective, such that: if $g^{(2)}(0)$ is 0, then one enzyme was in the field of view; and if $g^{(2)}(0)$ is not 0, then the number of emitters N is greater than 1, or noise is present in the detector signal.

Disclosed is a system, for performing absolute quantification of light-producing activity by enzymes by a bioluminescent single photon bioreactor, comprising: a pixel detector of the bioluminescent single photon bioreactor that produces a detector signal; an analyzer of the bioluminescent single photon bioreactor that receives the detector signal; a processor of the analyzer that determines a time of arrival of the detector signal; an autocorrelator module, stored in memory and coupled to the processor, that determines an autocorrelation among detector signals for threshold times of arrival of photons at pixel detector according to: the following equation for a single emitter in the field of view of an objective of the bioluminescent single photon bioreactor:

$$g^{(2)}(\tau) = 1 - e^{-\frac{\tau}{T}},$$

or $g^{(2)}(0)$ for the number of emitters N in the field of view (FOV) of the objective, such that: if $g^{(2)}(0)$ is 0, then one enzyme was in the field of view; and if $g^{(2)}(0)$ is not 0, then the number of emitters N is greater than 1, or noise is present in the detector signal.

Disclosed is a non-transitory computer storage media storing instructions for execution by a system of one or more processors, the system being included in a bioluminescent single photon bioreactor, and the instructions causing the one or more processors to perform operations comprising: producing, by a pixel detector of the bioluminescent single photon bioreactor, a detector signal; receiving, by an analyzer of the bioluminescent single photon bioreactor, the detector signal; determining, by the bioluminescent single photon bioreactor, a time of arrival of the detector signal; determining, by the bioluminescent single photon bioreactor, an autocorrelation among detector signals for threshold times of arrival of photons at pixel detector according to: the following equation for a single emitter in the field of view of an objective of the bioluminescent single photon bioreactor:

$$g^{(2)}(\tau) = 1 - e^{-\frac{\tau}{T}},$$

or $g^{(2)}(0)$ for the number of emitters N in the field of view (FOV) of the objective, such that: if $g^{(2)}(0)$ is 0, then one enzyme was in the field of view; and if $g^{(2)}(0)$ is not 0, then the number of emitters N is greater than 1, or noise is present in the detector signal.

Disclosed is a bioluminescent single photon bioreactor for performing absolute quantification of light-producing activity by enzymes, the bioluminescent single photon bioreactor comprising: a bioreactor that produces a bio-electronic signal; an electronic sensor in communication with the bioreactor that receives the bio-electronic signal from the bioreactor and produces an electrical transduction signal from the bio-electronic signal; and an analyzer in communication with the electronic sensor and that receives the electrical transduction signal from the electronic sensor and absolutely quantifies light-producing activity by enzymes from the electrical transduction signal.

BRIEF DESCRIPTION OF THE DRAWINGS

The following description cannot be considered limiting in any way. Various objectives, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
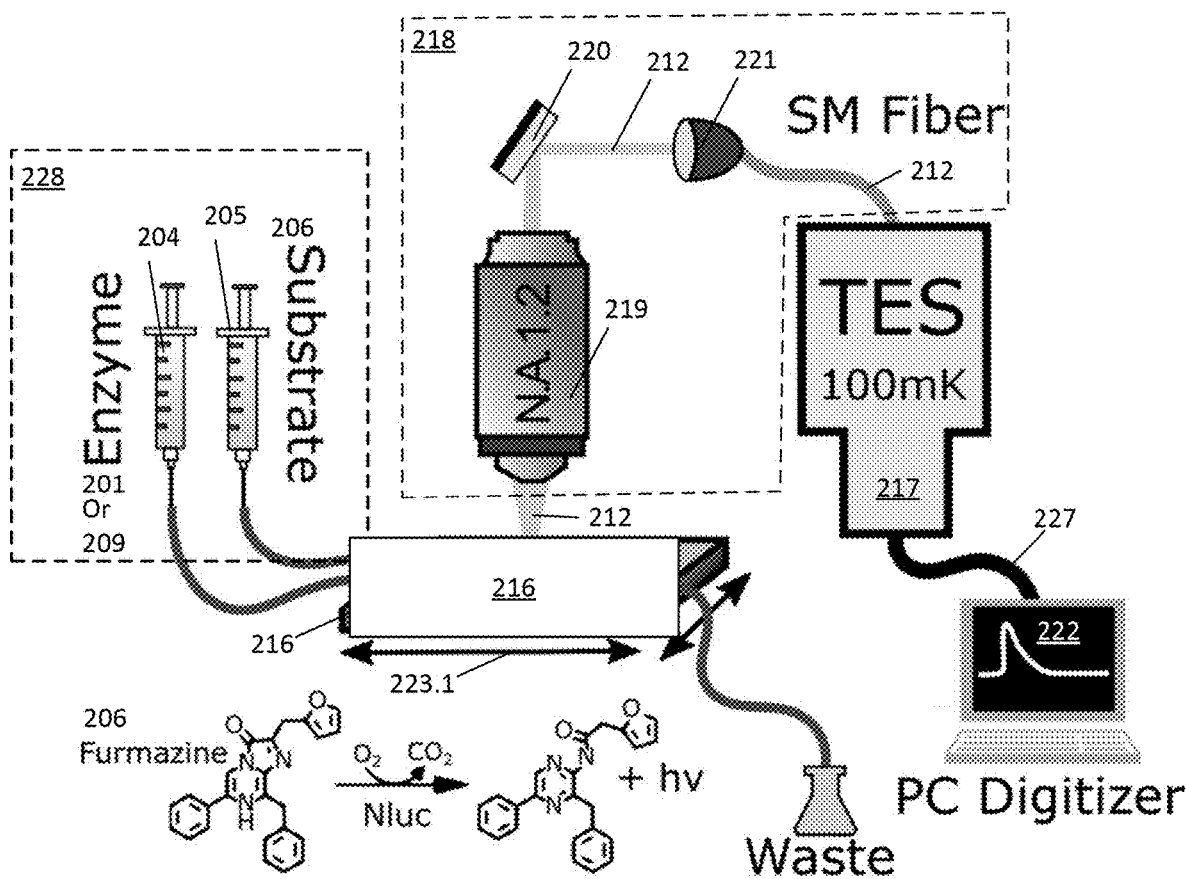
FIG. 1 shows a bioluminescent single photon bioreactor, according to some embodiments.

A detailed description of one or more embodiments is presented herein by way of exemplification and not limitation.

According to developments in optical measurement techniques in recent years, detection or measurement of faint light at the single photon or single fluorescent molecule level have become possible by using an optical system of a confocal microscope and a super high sensitive light detection technique capable of photon counting (single photon detection). Thus, there are variously proposed devices or methods of detecting single particles by means of such a faint light measurement technique to perform detection of a characteristic, an intermolecular interaction, a binding or dissociating reaction of a biological molecule, etc. For example, in fluorescence correlation spectroscopy (FCS), an optical system of a laser confocal microscope and a photon counting technique measure fluorescence intensity of fluorescent molecules or fluorescently labeled molecules (fluorescent molecules, etc.) entering into and exiting out of a micro region (the focal region to which the laser light of the microscope is condensed, called a "confocal volume") in a sample solution, and based on the average dwell time (translational diffusion time) of the fluorescent molecules and the average value of the number of the dwelling molecules in the micro region, determined from the autocorrelation function value of the measured fluorescence intensity, information is acquired for the motion speed and size or concentration of the fluorescent molecules as well as detection of various phenomena such as a change of a molecular structure or size, a binding or dissociative reaction or dispersion, or aggregation of molecules.

In techniques such as fluorescence intensity distribution analysis (FIDA) or photon counting histogram (PCH), there is generated a histogram of fluorescence intensity of fluorescent molecules entering into and exiting out of a confocal volume, measured similarly to FCS. The average value of the characteristic brightness of the fluorescent molecules and the average number of molecules dwelling in the confocal volume are calculated by fitting a statistical model formula to the distribution of the histogram, so that, based on the information thereof, the structure or size changes, binding or dissociative conditions, dispersion, or aggregation conditions of molecules can be estimated. In addition, detecting fluorescent substances may be based on a time progress of fluorescence signals of a sample solution measured using the optical system of a confocal microscope. Signal calculation processing can measure faint light from fluorescent fine particles flowing through a flow cytometer or fluorescent fine particles fixed on a substrate by a photon counting to detect the existence of fluorescent fine particles in the flow or on the substrate. In one manner of FCS, a system of a composition that contains a lot of dissolved light-emitting substances is studied so that the entry of a non-light-emitting particle dispersed in a composition in a confocal volume causes reduction of detected light intensity, wherein the translational diffusion time in the confocal volume and the average of dwelling particle counts of non-light-emitting particles are computed through an autocorrelation function value of the fluorescence intensity. Detection of fluorescence in this manner may be an indirect measure of particles in the confocal detection volume, which can be a technical drawback. Accordingly, some technical limitations of certain conventional fluorescent methods include aspects such as fluorescent light output depending on pump light properties and following all pump fluctuations, or fluorescence requires optical pumping with a strong pump that excites light that may not be associated with the effect of interest. As a result, one can obtain autofluorescence, Raman scattering, and the like that can significantly limit the signal-to-noise for observing low concentrations or single molecule effects.

To overcome these technical limitations, bioluminescence can be used to directly account for enzyme-substrate interactions, wherein a sample amount for the measurement can be extremely small with an extremely low concentration of analyte as compared with the conventional art. Thus, bioluminescent single photon detection provides quick testing at low cost in comparison with conventional biochemical methods, especially in conducting an analysis of a rare or expensive sample often used in the field of the medical or biological research and development or in conducting tests of a large number of specimens, such as clinical diagnosis or screening of bioactive substances.

It has been discovered that by applying nearly dark count-free photon detectors to bioluminescence measurements, nonclassical information is obtained that is not accessible by conventional light detectors. This allows a significantly enhanced quantification accuracy via a photon-number statistics measurement. Detection of bioluminescence may be the most accurate optical method for quantification of biological processes. Because bioluminescence is generated by tissues instead of being excited by an external source, the method is background-free. Bioluminescence can be used to study a broad range of topics, including aging, cancers, drug resistance, metabolism, and the like. The articles and processes described herein provide a real-time below-shot-noise-limit measurement of these and other biological processes by quantifying changes in biomarker concentration with ultimate sensitivity of a single light emitting enzyme.

Bioluminescent single photon bioreactor 200 and performing absolute quantification of light-producing activity by enzymes provide an absolute quantification of light-producing activity by enzymes that can enumerate the number of optically active enzymes on an absolute scale and quantify different biological processes in real time. Bioluminescent single photon bioreactor 200 detects the output signal with a photon-number resolving detector. Performing absolute quantification of light-producing activity by enzymes includes accumulating times of arrival and photon number statistics of single photons and applying first principles of quantum optics and provides the number of participating emitters. Bioluminescent single photon bioreactor 200 and performing absolute quantification of light-producing activity by enzymes collect the optical output from one or more enzyme molecules, provide noise-free collection of data, quantitatively monitor the rate of a biological activity in real-time, and solve the problem of quantification and intercomparison of various biological processes to more rapidly discover new drugs than conventional technology.

Light produced by a system of few optically active light emitters exhibits quantum behavior. Therefore, quantum measurement methods can be applied. A measurement of photon number statistics can unambiguously resolve the number of emitters in the system, and it is resilient to loss.

Bioluminescence light is generated from the chemical energy of biological molecules. Dissimilar from fluorescence measurements, no external light is required to make measurements so that there is no optical noise or background in a target biological system. Because in the bioluminescent single photon bioreactor 200 light comes from a finite number of quantum emitters during bioluminescence, bioluminescent measurement accuracy is below the shot noise limit. Accordingly, bioluminescent single photon bioreactor 200 provides absolute quantification of biological activities through detection of bioluminescence.

All-biological light emission may depend on availability of certain fuel molecules, such as firefly D-luciferin, and a catalyst such as an enzyme molecule, e.g., luciferase. Here, caged luciferin is supplied to the bio sample. Cages are molecules that are attached to luciferin, preventing it from interacting with the catalyst. Cages readily cleave from luciferin in a vicinity of target biomarkers, leaving the luciferin in its free form. Alternatively, two chemicals (CBT and D-Cysteine) can react and produce D-luciferin. Similarly, if one of the two chemicals (typically, D-Cysteine) is caged, no such reaction takes place. Analogously to caged luciferin, caged D-cysteine can uncage in presence of target biomarkers. In either scenario, D-luciferin in its free form is released from caged chemicals at a rate proportional to biomarker concentration. Therefore, if the number of catalyst luciferases in an optical interrogation volume, e.g., a confocal volume, is known, the intensity of the emitted light corresponds to the concentration of target biomarkers. Advantageously, bioluminescent single photon bioreactor 200 can all-optically track a real-time change in target biomarker concentration in living cells.

Multiple cages targeting certain bio-processes have been reported, including those for beta-galactosidase (a biomarker of aging), caspase 3 (a biomarker of apoptosis), $H_2O_2$ (a biomarker related Parkinson and Alzheimer), and beta-lactamases (a biomarker of certain drug resistant bacteria). Other cages can be used with bioluminescent single photon bioreactor 200.

For self-calibration, a sample of an unknown concentration of enzymes can be prepared and subsequently diluted by known factors to reach a range of concentrations. Although an average of enzymes can be arbitrary, this method can work with an average of enzymes ranging from about 1 enzyme (or less) to 10 enzymes per interrogation volume. Substrate (or luciferin) can be added so that the light-producing reaction is saturated. Then, photon number statistics are acquired for each diluted sample. The measurement data can be combined and fitted using a model from which the initial, unknown concentration is extracted.

During absolute quantification of light-producing activity by enzymes with bioluminescent single photon bioreactor 200, no external noise is present, but the number of enzymes can change in time. With the information acquired in this measurement, the intensity change due to variation in a biological activity (i.e. free luciferin concentration) can be separated from the intensity change from the number of enzymes variation. Photon generation by one (or few) quantum emitters is sub-Poisson for below-the-shot-noise measurements.

Bioluminescent single photon bioreactor 200 and performing absolute quantification of light-producing activity by enzymes provide better sensitivity and specificity than conventional background-free bioluminescent measurements used for bio-quantification. In conventional measurements, the number of active light emitters may not be known even within a factor of two. The sensitivity of conventional measurements may be limited by dark noise of sensors and conventional specificity may depend on relative measurements. In addition, bioluminescent single photon bioreactor 200 and performing absolute quantification of light-producing activity by enzymes provide an absolute scale for real-time bio-quantification measurements in vitro and ex vivo and can provide for intercomparison.

Bioluminescent single photon bioreactor 200 performs absolute quantification of light-producing activity by enzymes. In an embodiment, with reference to FIG. 1, bioluminescent single photon bioreactor 200 for detecting bioluminescence by single photon detection includes: bioreactor 216 in fluid communication with sample source 228 and that receives enzyme 201 or 209 and substrate 206 from sample source 228; confocal optical module 218 in optical communication with bioreactor 216 and that receives bioluminescent light 212 from bioreactor 216 and communicates bioluminescent light 212 to pixel detector 217; pixel detector 217 in optical communication with confocal optical module 218 that produces detector signal 227 from bioluminescent light 212; analyzer 222 in electrical communication with pixel detector 217 and that receives the detector signal 227 from pixel detector 217; a processor of analyzer 222 that determines a time of arrival of detector signal 227; an autocorrelator module, stored in memory and coupled to the processor, that determines an autocorrelation among detector signals 227 for threshold times of arrival of photons at pixel detector 217 according to: the following equation for a single emitter in the field of view of objective 219 of confocal optical module 218:

$$g^{(2)}(\tau) = 1 - e^{-\frac{\tau}{T}};$$

or
the following second-order autocorrelation equation for N-emitters in the FOV of the objective 219:

$$g^{(2)}(0) = 1 - 1/N < 1$$

if g(2)(0)=0, then one enzyme 201 was in the field of view; and if g(2)(0) is not 0, then the number of emitters N is obtained from 1-1/N of the autocorrelation function g(2).

In an embodiment, bioluminescent single photon bioreactor 200 includes confocal optical module 218 in communication with bioreactor 216 and analyzer 222, wherein confocal optical module 218 receives bioluminescent light 212 from bioreactor 216 and communicates bioreactor 216 to analyzer 222 from which analyzer 222 absolutely quantifies light-producing activity by enzymes also from bioluminescent light 212.

Sample source 228 can provide a fluid flow of enzyme 201, fluorophore compound 209, substrate 206 to bioreactor 216 via programmed or manual sourcing of these components. Various fluid delivery devices can be included in sample source 228 including syringes that serve as, e.g., enzyme supply 204 and substrate supply 205. A flow rate can be selected provide a tailored delivery rate or concentration of enzyme 201, fluorophore compound 209, substrate 206 to bioreactor 216. Sample source 228 can be fluidically connected to bioreactor 216 by tubing or microfluidic flow channels. It is contemplated that bioreactor 216 receives enzyme 201 at a dilute concentration.

Figure 6:
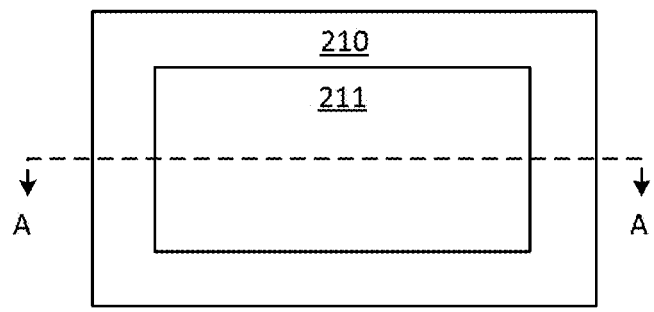
FIG. 6 shows a plan view of a bioreactor in panel and (panel B) a cross-section along line A-A of the bioreactor shown in panel A, according to some embodiments.
Figure 6:
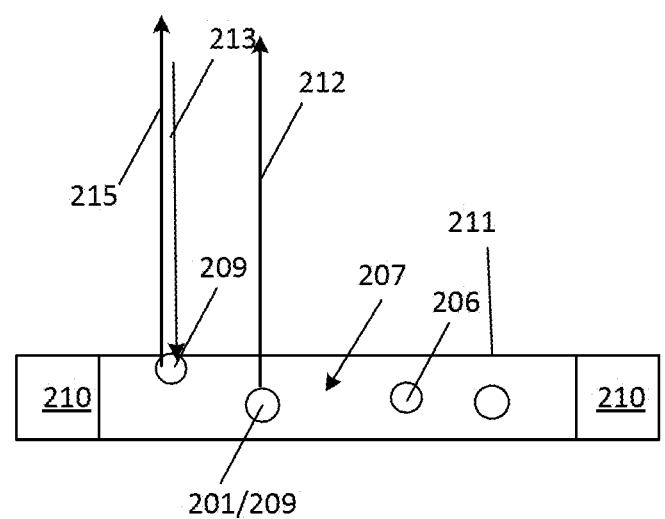
Figure 7:
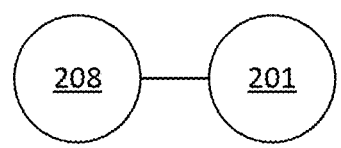
FIG. 7 shows a fluorophore compound, according to some embodiments.

In bioreactor 216, a bioreaction involving oxidizing the substrate 206 catalyzed by the enzyme 201 produces bioluminescent light 212 by the bioreaction, and confocal optical module 218 collects bioluminescent light 212 from bioreactor 216 and communicates bioluminescent light 212 to pixel detector 217, wherein pixel detector 217 detects bioluminescent light 212 from confocal optical module 218 prior to producing detector signal 227. Bioreactor 216 can be a vessel that contains substrate 206 and enzyme 201. In some embodiments, bioreactor 216 is a flow cell, wherein substrate 206 and enzyme 201 flow through bioreactor 216. In this case, fluids can flow from bioreactor 216 to a waste collector or can be recycled for reconstituting or recharging with enzyme 201, fluorophore compound 209, or substrate 206. Bioreactor 216 can be made from various materials (e.g., plastic, polymer, glass, ceramic, metal, and the like) that are compatible with enzyme 201, fluorophore compound 209, or substrate 206. In some embodiments, some or all of enzyme 201, fluorophore compound 209, and substrate 206 are immobilized in bioreactor 216. In some embodiments, some or all of enzyme, 201, fluorophore compound 209, and substrate 206 are located inside immobilized or not immobilized biological cell or cells. In some embodiments, some or all of enzyme, 201, fluorophore compound 209, and substrate 206 are produced by these cells. With reference to FIG. 6, bioreactor 216 can include frame 210 that bounds bioreaction chamber 207 on several sides and cover 211 disposed on frame 210. Cover 211 is optically transparent to wavelengths of bioluminescent light 212 or excitation light 213, which can be, e.g., visible light or ultraviolet light. Frame 210 can include flow holes or channels through which bioreaction chamber 207 is in fluid communication with sample source 228. Bioreaction chamber 207 can have a volume sufficiently large for the confocal volume of objective 219. Further, cover 211 can include a surface facing bioreaction chamber 207 that can be coated or functionalized with material to immobilize enzyme 201, substrate 206, or fluorophore compound 209. In some embodiments, cover 211 can be passivated to avoid immobilization of enzyme 201, substrate 206, or fluorophore compound 209 thereto. It is contemplated that bioreactor 216 can be stationary with respect to objective 219 so the field of view of objective 219 is constant with respect to bioreactor 216. In some embodiments, bioreactor 216 is non-stationary with respect to objective 219 so the field of view of objective 219 can be scanned laterally to bioreaction chamber 207 or brought closer or farther away from bioreaction chamber 207.

Bioreactor 216 is configured to optically characterize bioluminescent activity. In some embodiments, a syringe pusher is used to introduce separately prepared dilutions of substrate and enzyme into the chamber with, e.g., a 3 mm by 1 mm cross section and 20 mm length covered by a 1.7 µm thick cover slip as cover 211. A confocal optical setup for confocal optical module 218 can include an oil immersion microscope objective 219 with a 1.25 numerical aperture (N.A.) and a fiber-coupling lens. The collection volume can be approximately 0.1 femtoliter (fL). Photons are coupled into a fiber and then detected using pixel detector 217, e.g., a TES detector or photon detecting camera. A PC digitizer as analyzer 222 records the output waveforms from pixel detector 217.

Enzyme 201 can be any enzyme that interacts with substrate 206 to produce bioluminescent light 212. Exemplary enzymes 201 include luciferase enzymes (e.g., commercially available under the tradename Nanoluc). Enzyme 201 provides light emission through biological processes and can be a genetically engineered variant of a naturally occurring luciferase.

Rather than enzyme 201 by itself producing bioluminescent light 212 in response to interaction with substrate 206, enzyme 201 can be coupled to fluorophore 208 in fluorophore compound 209 that produces bioluminescent light 212 for single photon detection. Fluorophore 208 can be any moiety that provides energy exchange or absorption of light (e.g., excitation light 213) and can be, e.g., a quantum dot; fluorescein; fluorescent protein; and the like. Fluorophore compound 209 assists in locating enzyme 201, provides sensing capability, and association, wherein light is obtained from fluorophore 208 when enzyme 201 is excited, i.e., enzyme 201 produces bioluminescent light when substrate 206 is present, i.e., close enough for binding. When enzyme 201 produces bioluminescent light, fluorophore 208 receives bioluminescent light and can produce a photon having a different color if enzyme 201 and fluorophore 208 are proximate to one another. It is contemplated that proximate can refer to a configuration or arrangement. Accordingly, fluorophore 208 can aid in determining a position of enzyme 201 within field of view of objective 219. Fluorophore 208 can bonded or not to enzyme 201. It should be appreciated that bioluminescent light 212 is produced by enzyme 201 or fluorophore compound 209. Excitation light 213 can excite fluorescence from fluorophore 208 of fluorophore compound 209 as shown in FIG. 2.

Figure 2:
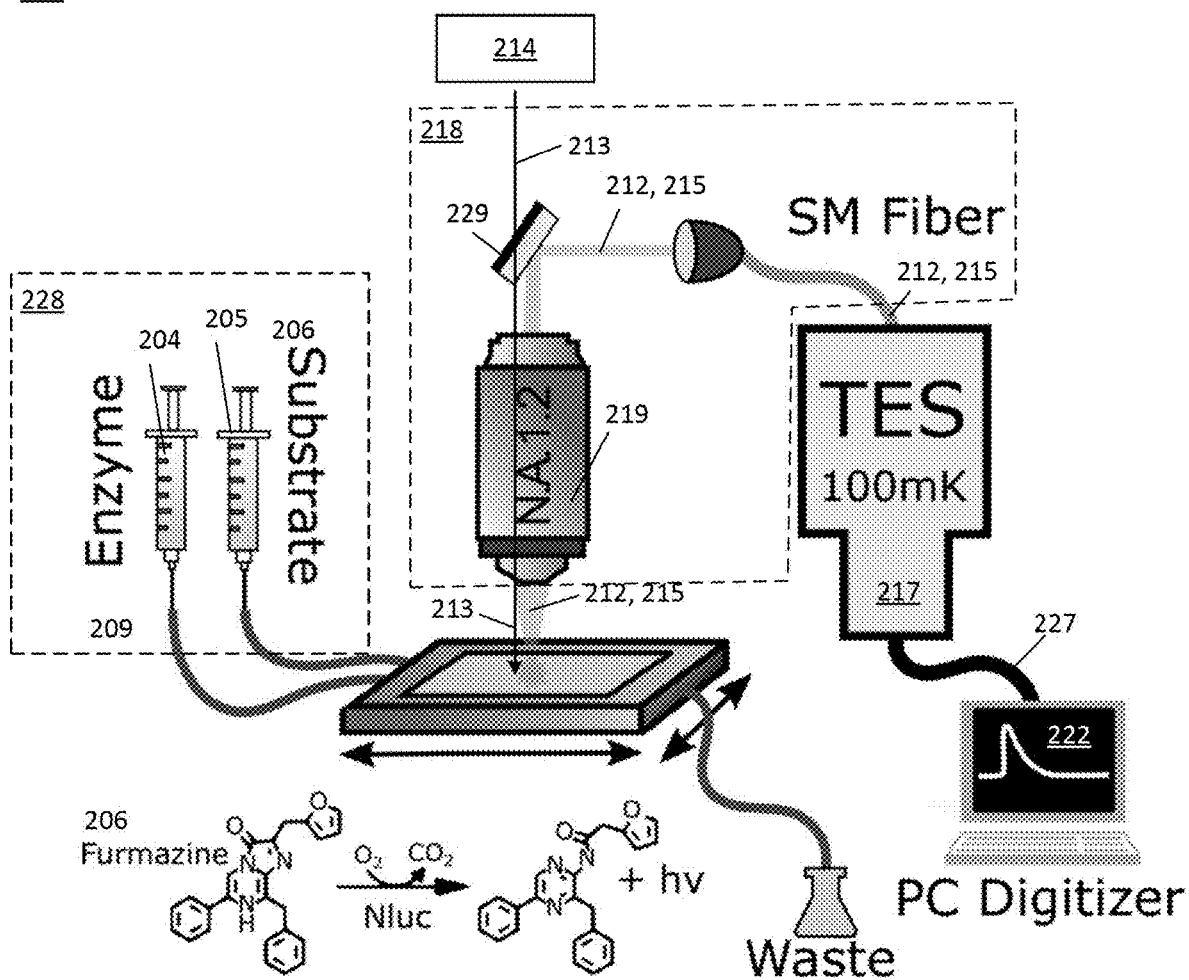
FIG. 2 shows a bioluminescent single photon bioreactor, according to some embodiments.

With reference to FIG. 2, which a dual-modality probe configuration, bioluminescent probes can be joined with other probes, such as fluorescent probes in different combinations. Enzymes labeled with fluorophores lead to fast spatial localization that aids absolute quantification. Single-photon bioluminescent resonance energy transfer (BRET) for biosensing of analytes can be realized in this manner. For instance, fLuc or nanoLuc can excite a different fluorophore, which is engineered into a construct whose efficiency of accepting the excitation is dependent on the concentration of an analyte. These analytes can be small molecules for which caged bioluminescent substrate measurements are not applicable. Here, laser 214 can provide excitation light 213 that excites fluorophore 208 in fluorophore compound 209. Bioluminescent light 212 And fluorescent light 215 produces in bioreactor 216 are communicated to and received by objective 219 and communicated to pixel detector 217.

Substrate 206 is a substrate for enzyme 201. Exemplary substates 206 include a luciferin such as furmazine. It is contemplated that substate 206 is subject to oxidation by enzyme 201, and in response to oxidation produces bioluminescent light 212.

Confocal optical module 218 receives bioluminescent light 212 from bioreactor 216 and can include components to produce a confocal optical collection volume with a field of view on a selected portion of bioreaction chamber 207 as well as collect bioluminescent light 212 and fluorescent light 215 and optionally transmit excitation light 213 to bioreaction chamber 207. In an embodiment, confocal optical module 218 components such as objective 219 to create a confocal field of view in bioreactor 216 and to collect optical radiation (e.g., bioluminescent light 212 and fluorescent light 215) from bioreactor 216, transmit optical radiation (e.g., excitation light 213) to bioreactor 216; mirror 229 to direct light; optical coupler 230 to couple fiber optic to free-space propagation of light; and fiber optic (e.g., single mode fiber optic) to communicate light (e.g., bioluminescent light 212, fluorescent light 215 to pixel detector 217.

Pixel detector 217 is in optical communication with confocal optical module 218 and receives bioluminescent light 212 from confocal optical module 218. Bioluminescent light 212 from enzyme 201 may be a weaker optical signal than fluorescent light produced by fluorescent probes, and it is challenging to reach absolute quantitation of a biological process using bioluminescence. This is particularly difficult at the single molecule level where the signal could be at the level of the background noise of the detector being used. To perform single molecule measurement with bioluminescent emitter, pixel detector 217 is highly efficient and has low noise. Pixel detector 217 can include a superconducting transition edge sensor detector or interleaved superconducting nanowires that generate electrical signal upon photon arrival and absorption in such a way that the analysis of that electrical signal can discriminate between none, one, two, and a few photons with enumeration. Photon number enumeration can be obtained by optically multiplexing several ordinary (non photon number resolving) detectors in a detector tree configuration. The arrival times can be derived from the temporal dependence of the output electrical signal as leading edges. The photon number can be obtained from peak amplitude or integral amplitude or an analog matched filter output amplitude of the electrical pulses or as digital information. In an embodiment, pixel detector 217 is a superconducting transition edge sensor or a visible light photon counter, or an interleaved superconductor nanowire single photon detector. Other exemplary single photon detectors include an avalanche photodiode in a photon detection mode, superconducting nanowire single photon detector, single-photon sensitive camera, or a photomultiplier tube. Upon receipt of bioluminescent light 212, pixel detector 217 produces detector signal 227 that can be an electrical pulse with a rising edge that contains information about arrival time of the photon at the detector. In particular, the transition edge sensor is a cryogenic energy sensor that exploits strong temperature-dependent resistance of a superconducting phase transition with high stability such as one dark count every two hours.

Analyzer 222 is electrically connected to pixel detector 217 and can include various signal-receiving and signal analyzing components. Pixel detector 217 can include an amplitude-to-digital coder and a processing unit such as a field programmable gate array (FPGA) or a microprocessor. The processing unit can be configured to extract number of photons from detector signal 227 produced by pixel detector 217 and calculate second, third or higher order correlation of photon arrivals.

Figure 3:
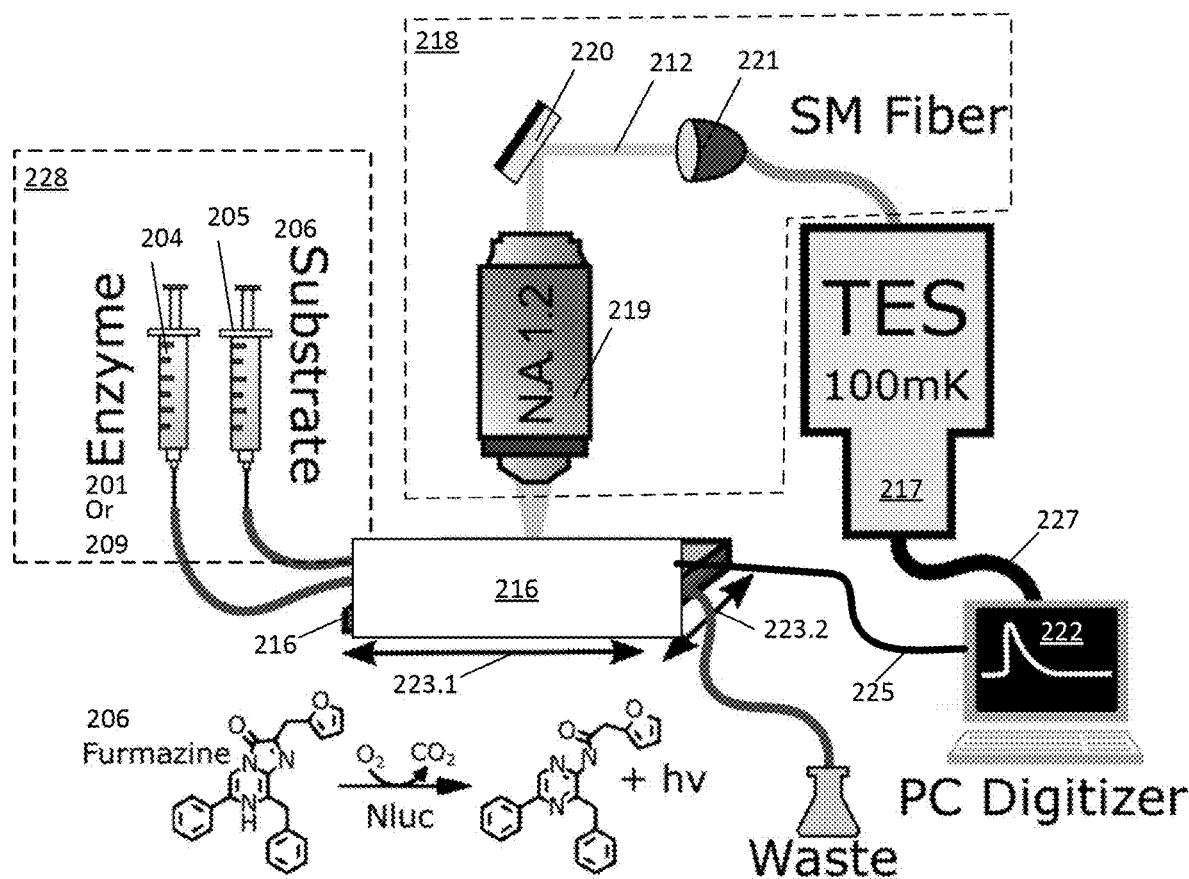
FIG. 3 shows a bioluminescent single photon bioreactor, according to some embodiments.
Figure 4:
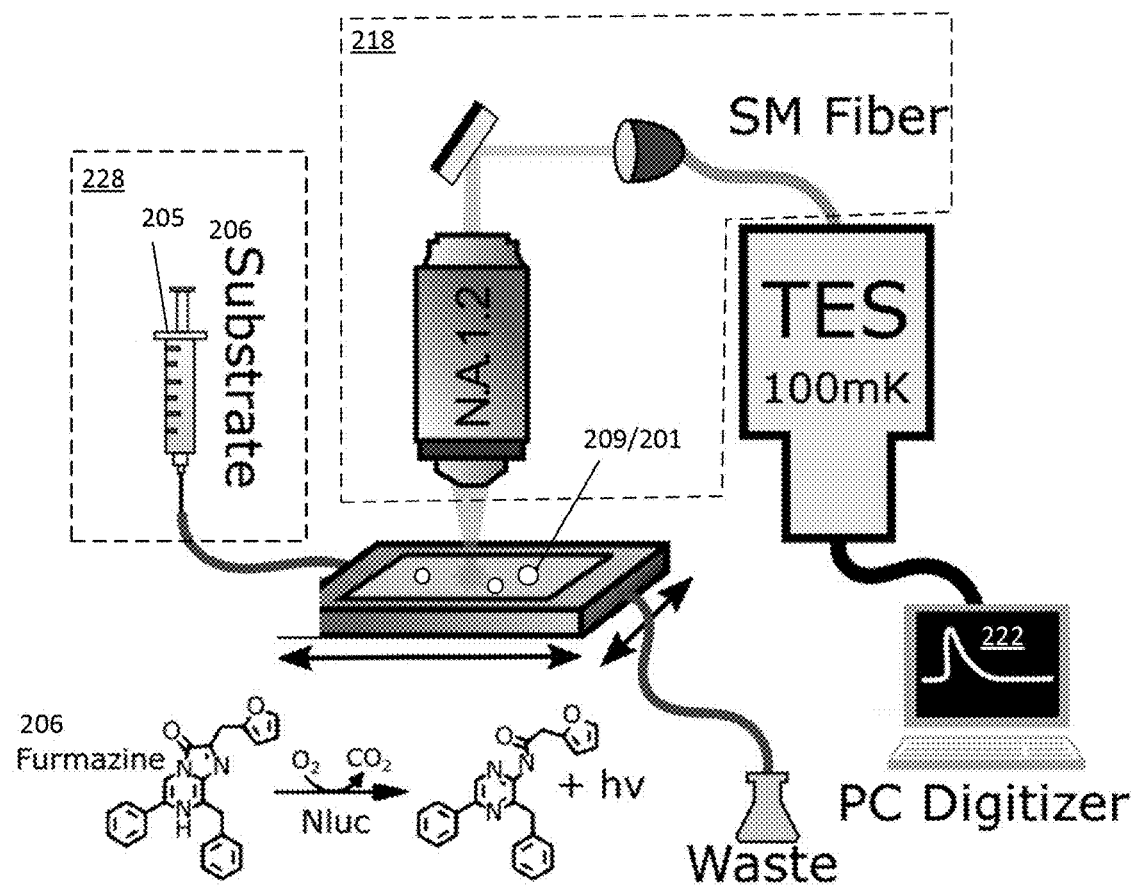
FIG. 4 shows a bioluminescent single photon bioreactor, according to some embodiments.
Figure 5:
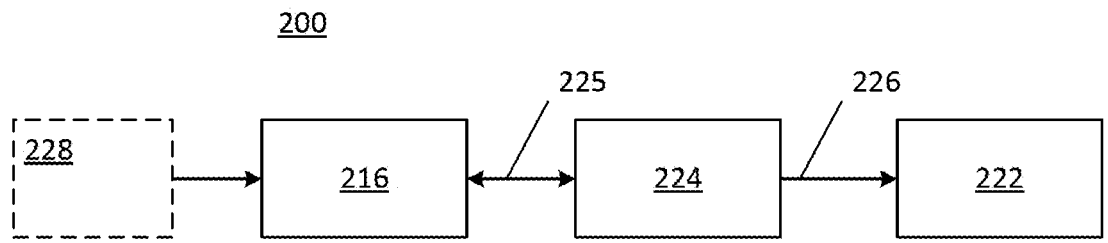
FIG. 5 shows a bioluminescent single photon bioreactor with bio-electronic signal being produced in a bioreactor in panel A and an electronic signal and bioluminescent light being produced in a bioreactor in panel B, according to some embodiments.
Figure 5:
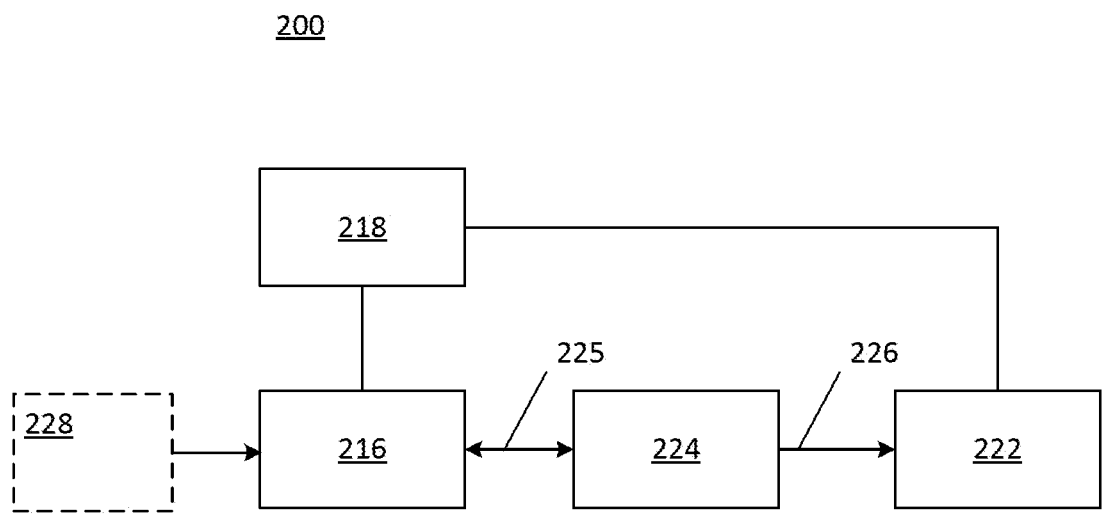

In certain embodiments, with reference to FIG. 3 and FIG. 5, enzyme 201 or fluorophore compound 209, in bioreactor 216, produces bio-electronic signal 225, and bioluminescent single photon bioreactor 200 includes electronic sensor 224 in communication with bioreactor 216. Electronic sensor 224 receives bio-electronic signal 225 from bioreactor 216 and produces electrical transduction signal 226 from bio-electronic signal 225. Analyzer 222 is in electrical communication with electronic sensor 224 and receives electrical transduction signal 226 from electronic sensor 224 and absolutely quantifies light-producing activity by enzymes from electrical transduction signal 226. In some embodiments, bioluminescent single photon bioreactor 200 includes bioreactor 216 and electronic sensor 224 (panel A, FIG. 5) and optionally confocal optical module 218 for optical detection (panel B, FIG. 5). Here, it is contemplated that detection modalities might not be optical. Single-enzyme single-photon emission can be used for in-situ single-photon triggering/excitation of biological events. For example, single-photon triggering of retinal rod cell responses produce an electrical current read-out as, e.g., bio-electronic signal 225.

Bioluminescent single photon bioreactor 200 can be made in various ways. It should be appreciated that bioluminescent single photon bioreactor 200 includes a number of optical, electrical, or mechanical components, wherein such components can be interconnected and placed in communication (e.g., optical communication, electrical communication, mechanical communication, and the like) by physical, chemical, optical, or free-space interconnects. The components can be disposed on mounts that can be disposed on a bulkhead for alignment or physical compartmentalization. As a result, bioluminescent single photon bioreactor 200 can be disposed in a terrestrial environment or space environment. Elements of bioluminescent single photon bioreactor 200 can be formed from silicon, silicon nitride, and the like although other suitable materials, such ceramic, glass, or metal can be used. According to an embodiment, the elements of bioluminescent single photon bioreactor 200 are formed using 3D printing although the elements of bioluminescent single photon bioreactor 200 can be formed using other methods, such as injection molding or machining a stock material such as block of material that is subjected to removal of material such as by cutting, laser oblation, and the like. Accordingly, bioluminescent single photon bioreactor 200 can be made by additive or subtractive manufacturing. In an embodiment, elements of bioluminescent single photon bioreactor 200 such as bioreactor 216 are selectively etched to remove various different materials using different etchants and photolithographic masks and procedures. The various layers thus formed can be subjected to joining by bonding or using mechanical couplers to form bioluminescent single photon bioreactor 200.

It is contemplated that bioluminescent single photon bioreactor 200 and performing absolute quantification of light-producing activity by enzymes can be implemented in various ways. In an embodiment, a method implemented by a system of one or more processors, the system being included in a bioluminescent single photon bioreactor 200 and for performing absolute quantification of light-producing activity by enzymes by bioluminescent single photon bioreactor 200, includes: producing, by pixel detector 217 of bioluminescent single photon bioreactor 200, detector signal 227; receiving, by analyzer 222 of bioluminescent single photon bioreactor 200, detector signal 227; determining, by bioluminescent single photon bioreactor 200, a time of arrival of detector signal 227; determining, by bioluminescent single photon bioreactor 200, an autocorrelation among detector signals 227 for threshold times of arrival of photons at pixel detector 217 according to: the following equation for a single emitter in the field of view of objective 219 of bioluminescent single photon bioreactor 200:

$$g^{(2)}(\tau) = 1 - e^{-\frac{\tau}{T}},$$

$$\Gamma^{(2)}(0) = 1 - \frac{1 - \exp(-\Delta\tau/T)}{\Delta\tau/T};$$

or
the following second-order autocorrelation equation for the number of emitters N in the FOV of objective 219:

$$g^{(2)}(0) = 1 - 1/N < 1$$

if $g^{(2)}(0)=0$, then one enzyme 201 was in the field of view; and if $g^{(2)}(0)$ is not 0, then the number of emitters N is obtained from 1-1/N of the autocorrelation function $g^{(2)}$.

In an embodiment, the method includes: receiving, by bioreactor 216 of bioluminescent single photon bioreactor 200, enzyme 201 at a dilute concentration; receiving, by bioreactor 216, substrate 206; catalyzing a bioreaction involving substrate 206 and enzyme 201 in bioreactor 216; producing bioluminescent light 212 by the bioreaction; collecting, by confocal optical module 218, bioluminescent light 212 from bioreactor 216; communicating bioluminescent light 212 from confocal optical module 218 to pixel detector 217; and detecting, by pixel detector 217, bioluminescent light 212 from confocal optical module 218 prior to producing, by pixel detector 217, detector signal 227.

In an embodiment, the method includes measuring second-order autocorrelation function $g^{(2)}$ with bioluminescent single photon bioreactor 200. Measuring the second-order autocorrelation function $g^{(2)}$ can include: identifying timestamps of photon detection times; and defining a time interval $\Delta\tau$ for accumulating co-incidences. Enzyme 201 can be immobilized to a portion of bioreactor 216. Alternatively, enzyme 201 can flow into bioreactor 216 from enzyme supply 204 and flow through bioreactor 216 in absence of immobilization to bioreactor 216.

In an embodiment, the method includes: receiving fluorophore compound 209 including enzyme 201 in bioreactor 216; receiving excitation light 213 by fluorophore compound 209 in bioreactor 216; producing fluorescent light 215 by fluorophore compound 209 in response to receipt of excitation light 213; communicating fluorescent light 215 from bioreactor 216 to confocal optical module 218; communicating fluorescent light 215 from confocal optical module 218 to pixel detector 217; and detecting fluorescent light 215 from confocal optical module 218 by pixel detector 217, such that detector signal 227 further includes components due to fluorescent light 215. The fluorescent light 215 can be separated from the luminescent light 212. In an embodiment, The fluorescent light 215 can be separated from the luminescent light 212 by spectral filtering. The emission of the fluorescent light 215 can be controlled by controlling properties of excitation light 213; those properties include intencity, wavelength. Benefitially, once the scene is assessed by measuring fluorescent light 215, excitation light 213 can be turned off, and the biological activity of interest can be inferred by measuring the rate of detection of the luminescent light 212 with no disturbance from fluorescent light 215. In an embodiment, the scene assessment is based on finding the fluorescent compound molecules 209 by the maximum rate of photon detection of the fluorescent light 215. In another embodiment, the scene assessment requires measuring of and characterization of correlation functions, and the number of fluorescent emitters can be found using the same formula: the second-order autocorrelation equation for the number of emitters N in FOV of objective 219:

$$g^{(2)}(0) = 1 - 1/N < 1$$

if $g^{(2)}(0)=0$, then one fluorescent compound 209 was in the field of view; and if $g^{(2)}(0)$ is not 0, then the number of fluorescent compounds N is obtained from 1-1/N of the autocorrelation function $g^{(2)}$.

In an embodiment, a system, for performing absolute quantification of light-producing activity by enzymes by bioluminescent single photon bioreactor 200, includes: pixel detector 217 of bioluminescent single photon bioreactor 200 that produces detector signal 227; analyzer 222 of bioluminescent single photon bioreactor 200 that receives detector signal 227; a processor of analyzer 222 that determines a time of arrival of detector signal 227; an autocorrelator module, stored in memory and coupled to the processor, that determines an autocorrelation among detector signals 227 for threshold times of arrival of photons at pixel detector 217 according to: the following equation for a single emitter in the field of view of objective 219 of bioluminescent single photon bioreactor 200:

$$g^{(2)}(\tau) = 1 - e^{-\frac{\tau}{T}},$$

or
the following second-order autocorrelation equation for N-emitters in the FOV of objective 219:

$$g^{(2)}(0) = 1 - 1/N < 1$$

if $g^{(2)}(0)=0$, then one enzyme 201 was in the field of view; and if $g^{(2)}(0)$ is not 0, then the number of emitters N is obtained from 1-1/N of the autocorrelation function $g^{(2)}$.

The system further can include bioreactor 216 of bioluminescent single photon bioreactor 200 that receives enzyme 201 at a dilute concentration and substrate 206, wherein: in bioreactor 216 a bioreaction involving substrate 206 is catalyzed by the enzyme 201 with production of bioluminescent light 212 by the bioreaction; confocal optical module 218 collects bioluminescent light 212 from bioreactor 216 and communicates bioluminescent light 212 to pixel detector 217; and pixel detector 217 detects bioluminescent light 212 from confocal optical module 218 prior to producing detector signal 227. Bioluminescent single photon bioreactor 200 measures the second-order autocorrelation function $g^{(2)}$, wherein the autocorrelator module measures the second-order autocorrelation function $g^{(2)}$ by: identifying timestamps of photon detection times; and defining a time interval $\Delta\tau$ for accumulating co-incidences. Enzyme 201 can be immobilized to a portion of the bioreactor 216 to not move freely through the bioreactor 216, or enzyme 201 flows into bioreactor 216 from enzyme supply 204 and flows through bioreactor 216 in absence of immobilization to bioreactor 216.

In the system, bioreactor 216 can receive fluorophore compound 209 including enzyme 201; fluorophore compound 209 receives excitation light 213 in bioreactor 216 and produces fluorescent light 215 in response to receipt of excitation light 213; fluorescent light 215 is communicated from bioreactor 216 to confocal optical module 218; confocal optical module 218 communicates fluorescent light 215 from bioreactor 216 to pixel detector 217; and pixel detector 217 detects fluorescent light 215 from confocal optical module 218, such that detector signal 227 further includes components due to fluorescent light 215. The emission of the fluorescent light 215 can be controlled by controlling properties of excitation light 213; those properties include intencity, wavelength. Benefitially, once the scene is assessed by measuring fluorescent light 215, excitation light 213 can be turned off, and the biological activity of interest can be inferred by measuring the rate of detection of the luminescent light 212 with no disturbance from fluorescent light 215. In an embodiment, the scene assessment is based on finding the fluorescent compound molecules 209 by the maximum rate of photon detection of the fluorescent light 215. In another embodiment, the scene assessment requires measuring of and characterization of correlation functions, and the number of fluorescent emitters can be found using the same formula: the second-order autocorrelation equation for the number of emitters N in the FOV of objective 219:

$$g^{(2)}(0)=1-1/N<1$$

if $g^{(2)}(0)=0$, then one fluorescent compound 209 was in the field of view; and if $g^{(2)}(0)$ is not 0, then the number of fluorescent compounds N is obtained from 1-1/N of the autocorrelation function $g^{(2)}$.

In an embodiment, a non-transitory computer storage media storing instructions for execution by a system of one or more processors, the system is included in bioluminescent single photon bioreactor 200, and the instructions cause the one or more processors to perform operations including: producing, by pixel detector 217 of bioluminescent single photon bioreactor 200, detector signal 227; receiving, by analyzer 222 of bioluminescent single photon bioreactor 200, detector signal 227; determining, by bioluminescent single photon bioreactor 200, a time of arrival of detector signal 227; determining, by bioluminescent single photon bioreactor 200, an autocorrelation among detector signals 227 for threshold times of arrival of photons at pixel detector 217 according to: the following equation for a single emitter in the field of view of objective 219 of bioluminescent single photon bioreactor 200:

$$g^{(2)}(\tau) = 1 - e^{-\frac{\tau}{T}};$$

or
the following second-order autocorrelation equation for N-emitters in the FOV of the objective 219:

$$g^{(2)}(0)=1-1/N<1$$

such that: if $g^{(2)}(0)=0$, then one enzyme 201 was in the field of view; and if $g^{(2)}(0)$ is not 0, then the number of emitters N is obtained from 1-1/N of the autocorrelation function $g^{(2)}$.

The instructions can further include: receiving, by bioreactor 216 of bioluminescent single photon bioreactor 200, enzyme 201 at a dilute concentration; receiving, by bioreactor 216, substrate 206; catalysing bioreaction involving substrate 206 and enzyme 201 in bioreactor 216; producing bioluminescent light 212 by the bioreaction; collecting, by confocal optical module 218, bioluminescent light 212 from bioreactor 216; communicating bioluminescent light 212 from confocal optical module 218 to pixel detector 217; and detecting, by pixel detector 217, bioluminescent light 212 from confocal optical module 218 prior to producing, by pixel detector 217, detector signal 227. The computer storage media further can include measuring the second-order autocorrelation function $g^{(2)}$ with bioluminescent single photon bioreactor 200. The computer storage media can include measuring the second-order autocorrelation function $g^{(2)}$ that includes: identifying timestamps of photon detection times; and defining a time interval $\Delta\tau$ for accumulating co-incidences. The enzyme 201 can immobilized to a portion of bioreactor 216, to move freely through bioreactor 216, or enzyme 201 can flow into bioreactor 216 from enzyme supply 204 and flows through bioreactor 216 in absence of immobilization to bioreactor 216. In addition, the enzyme 201 may be confined to a biological cell that is either immobilized in the bioreactor 216, moves freely through the bioreactor 216 or can flow into bioreactor 216 from the enzyme supply 204. The instructions can include: receiving fluorophore compound 209 including enzyme 201 in bioreactor 216; receiving excitation light 213 by fluorophore compound 209 in bioreactor 216; producing fluorescent light 215 by fluorophore compound 209 in response to receipt of excitation light 213; communicating fluorescent light 215 from bioreactor 216 to confocal optical module 218; communicating fluorescent light 215 from confocal optical module 218 to pixel detector 217; and detecting fluorescent light 215 from confocal optical module 218 by pixel detector 217, such that detector signal 227 further includes components due to fluorescent light 215.

Bioluminescent single photon bioreactor 200 and processes disclosed herein have numerous beneficial uses, including identifying and characterizing the bioprocesses originating from a single enzyme. The sensitivity to the optical signal from the single enzyme enables the analysis of trace amounts of biomarkers and real-time changes in target biological activity, even when such activity occurs at a low rate. This is beneficial for studying the early stage disease and transient temporal effects e.g. these associated with an on-going biological function aiding drug discovery. Advantageously, bioluminescent single photon bioreactor 200 overcomes limitations and technical deficiencies of conventional devices and conventional processes such as relatively high noise level typically involving as many as a thousand enzyme molecules in a focal volume to observe target biological activity. In addition, because the number of participating molecules cannot be exactly known, the conventional measurement is shot-noise limited. Further, conventionally, small changes in photon flux cannot be directly attributed to the changes in the observed biological function only: deviations in photon flux can be caused by the random change of the number of participating enzymes.

Certain environments have a natural optical background that can include photosynthetic organisms such as plants and algae. In conventional processes, laser excitation cannot spatially localize the excitation because the sample contains so many fluorophores and is spectrally congested. These conventional process are not as sensitive as performing absolute quantification of light-producing activity by enzymes described herein. Accordingly, bioluminescent single photon bioreactor 200 can provide higher precision and accuracy than conventional devices. Moreover, bioluminescent single photon bioreactor 200 and performing absolute quantification of light-producing activity by enzymes provide a signal in a high background and can use the genetic encoding, e.g., of nanoLuc, attached to a cellular component, such that when a bioluminescent photon is detected, the photon comes from the spatially-targeted enzyme within the cell.

In quantum optics, one can determine the system is collecting light from a single emitter by observing antibunching behavior of the emitted light, e.g., by measuring the second order autocorrelation function $g^{(2)}$. The second order autocorrelation function $g^{(2)}$ is used to characterize the autocorrelation of the intensity fluctuations at time t with those at a later time t+τ. Given the detection of n photons at time t, the second order autocorrelation function $g^{(2)}$ provides the probability of detecting a similar number of photons at a later time t+τ. The characteristic dip of a $g^{(2)}(\tau)$ measurement from a single emitter occurs after excitation because the emitter returns to some inactive state and cannot immediately emit a subsequent photon. For a coherent source such as a laser with the time independent intensity $I_0$, $g^{(2)}(\tau)=1$ for any value of $\tau$. This $g^{(2)}(\tau)$ measurement is resilient to loss, and if the emitter has two or more states: i.e. at least one inactive state where no photon emission can occur and at least one active state where photon emission ca occur, it may not be possible to receive two photons within the excited state lifetime of the emitter. Accordingly, bioluminescent single photon bioreactor 200, provides a high-fidelity system for performing absolute quantification of light-producing activity by enzymes by quantifying the number of participating enzymes independently from other factors such as loss, substrate concentration, temperature, and the like.

It is contemplated that the biomarker optical signal can include noise. The noise can include detector dark counts or uncontrolled optical background at the target. Optical noise affects the value of $g^{(2)}$ but can be separately measured. A noise correction can be applied to $g^{(2)}$. The time bin for statistics accumulation can be chosen such that the probability to observe M photons decreases with number of detected photons in that time bin (e.g., $P_1 \gg P_2 \gg P_3 \ldots$). An approximate expression is $g^{(2)}(0) \approx 2P_2/(P_1)^2$, wherein $P_1 \approx N p_e + p_n$ and $P_2 \approx p^2_n/2 + N p_n p_e + N^2 p^2_e/2(1-1/N)$ and corresponds to probabilities of detecting one and two photons, respectively. Here, $p_n$ is measured when no enzymes are present, $Np_e$ is known from the measured $P_1$: $(N p_e = P_1 - p_n)$. As before, N is the number of enzymes in the interrogation volume. Here, $p_n$ and $p_e$ are probabilities of detecting one photon from a noise source and from a single enzyme respectively.

Substituting $P_1$, $P_2$ into the approximate expression for $g^{(2)}(0)$, we get a formula for a permanent number of enzymes:

$$g^{(2)}(0)|_N = \frac{N^2 p_e^2(1-1/N) + 2N p_n p_e + p_n^2}{(N p_e + p_n)^2}.$$

Because $g^{(2)}$ is known from the measurement, the above formula gives N, and therefore $p_e$ is obtained as $p_e = (Np_e)/N$. Alternatively, measurements at different values of N can be made and verified through the $g^{(2)}$ values obtained.

If a constant number of emitters in the collection volume during the calibration measurement cannot be achieved, in some cases, for constant concentration <N>, the number of emitters is a Poisson distribution as follows.

$$g^{(2)}(0)/\max(g^{(2)}(\tau))|_{\langle N \rangle} = \left[1 + \frac{\langle N \rangle p_e^2}{(\langle N \rangle p_e + p_n)^2}\right]^{-1}$$

The shape of $g^{(2)}(\tau)$ value of T where the maximum $\max(g^{(2)}(\tau))$ occurs depends on the particular mechanism that leads to changing the number of emitters in the collection volume. Then value of T gives a characteristic time of the underlying process that leads to changing the number of emitters. The $\max(g^{(2)}(\tau))$ value itself could be used as an estimate of <N>, but this estimate is not as reliable as the ratio above. For calibration, measurements should be taken at several different concentrations <N> and fit to the theory. Together with the measurement of $P_1$: $P_1 \approx \langle N \rangle p_e + p_n$. Thus, $p_n$, $p_e$ and the scale for <N> can be found from our absolute calibrating measurement.

Bioluminescent single photon bioreactor 200 and processes herein unexpectedly separate changes in the emission due to the change of the number of enzymes from the changes in the emission due to the change of the concentration of substrate. Moreover, bioluminescent single photon bioreactor 200 provides significantly lower noise, partially because measurements on a single photon emitter may yield measurement noise below the classical shot noise limit. Finally, in canonical (and classical) Michaelis-Menten kinetics model of enzyme-catalyzed chemical reactions, certain kinetic constants are theoretically introduced bat can only be characterized by their ratios, i.e. indirectly. Unexpectedly, transient effects in photon emission of the single enzyme can be measured in absolute units by bioreactor 200 and processes herein i.e. from observing the recovery time T.

The articles and processes herein are illustrated further by the following Example, which is non-limiting.

EXAMPLE

Quantum-Enabled Quantification of Real-Time Biological Processes

Bioluminescence is a type of chemiluminescence in which a living organism emits light when a particular enzyme (such as luciferase, nanoluc, etc.) catalyses the oxidation of a small substrate molecule (such as D-luciferin, furimazine, etc.). Bioluminescent proteins are widely used in biomedical research for imaging or as assays due to their unprecedented sensitivity, ease of use, and relatively low-cost. They are an invaluable tool in the study of in vivo and in vitro processes such as tumour growth, drug delivery and disease diagnosis. In contrast to fluorescence, bioluminescence does not require an external source of illumination to emit light, circumventing the adverse effects of phototoxicity in cells and bleached reporters, allowing for long term, continuous cell studies. Furthermore, bioluminescence is optical-background-free. Therefore, bioluminescent markers are preferable to use when dealing with delicate photosensitive samples or when there is a dim signal hindered by scattered light coming from the excitation source, autoluminescence or other factors. Moreover, the substrate can be caged by conjugating it with a distinct functional group, preventing it from interacting with its complementary enzyme. The caged substrate may then be cleaved by a distinct enzyme or a bioactive molecule reenabling the catalytic reaction. Thus, the luciferin is turned into a reporter of enzyme or cell physiological activity. Bioluminescent quantification only depends on the in-situ conditions (as opposed to fluorescence imaging and quantification which depends on frequency and intensity of the excitation light), and therefore can more accurately describe the underlying biological processes.

Figure 8:
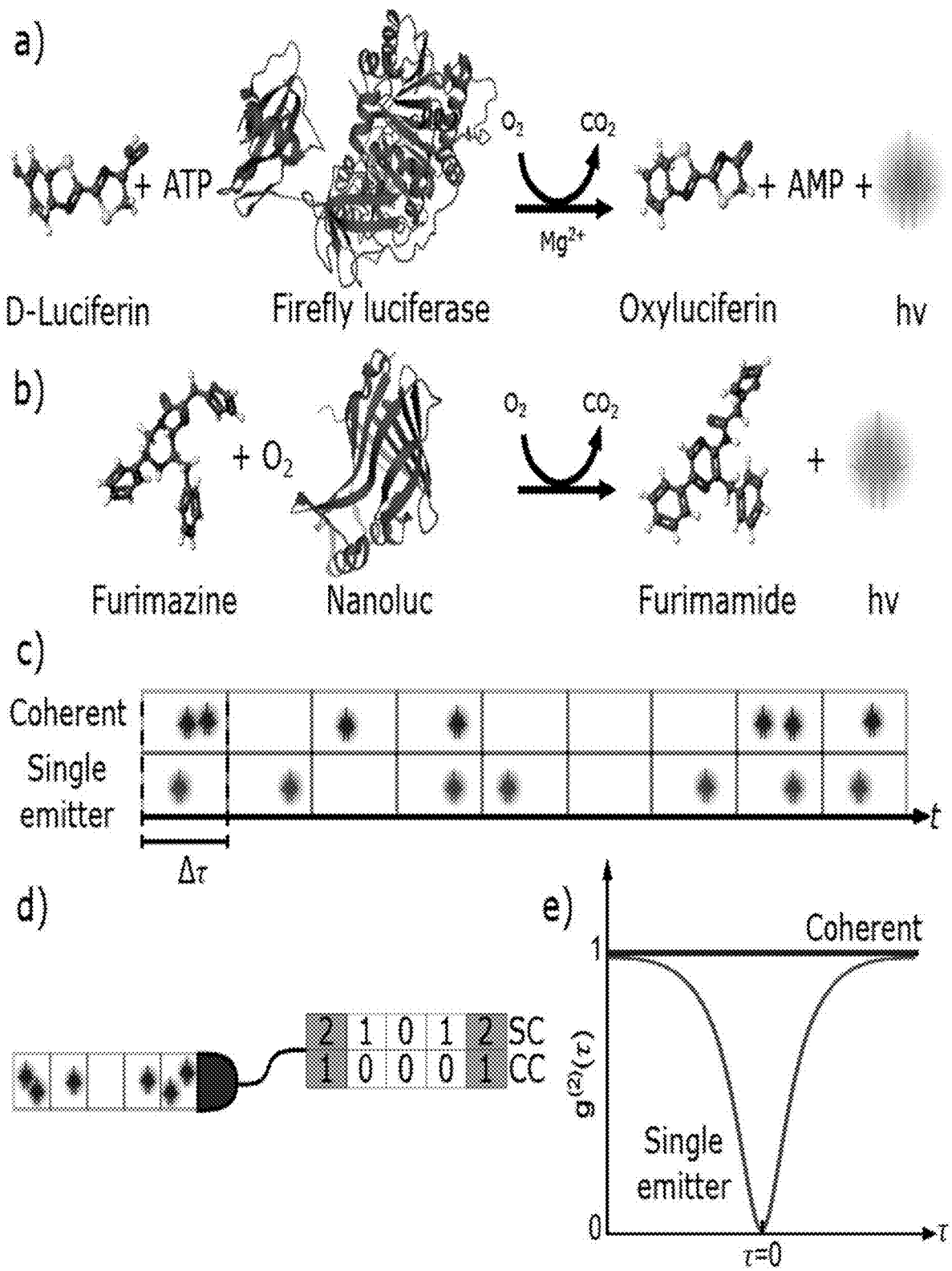
FIG. 8 shows: (a) catalyzation of D-Luciferin by firefly luciferase (PDB code 1LCI); (b) catalyzation of furimazine by nanoluc (PDB code 5IBO), wherein spectral peaks of firefly and nanoluc are 560 nm and 480 nm respectively; (c) comparison between single emitter and coherent light; (d) a coincidence count detection scheme; and (e) a second order auto-correlation function $g^{(2)}(\tau)$ according to the Example.

The bioluminescence is based on an enzyme-catalyzed process, where the enzyme associates with the substrate, resulting in high-efficiency single photon emission, FIGS. 8(a) and (b). An enzyme similar to nanoluc and furimazine substrate was used, FIG. 8(b). The nature-derived firefly luciferin-luciferase assay, which is the most popular assay for both in vivo and in vitro settings, can be used. Firefly luciferase is a larger enzyme than nanoluc. A chemical difference is that firefly luciferase requires ATP in addition to luciferin and oxygen to produce light. The combination of the above factors enables high turnover of the nanoluc/furimazine as compared to the luciferase/D-lucifirin.

Quantum Properties of Single Emitters

Due to low brightness, it may be challenging to reach absolute quantitation of a biological process measuring bioluminescence. This is particularly difficult at the single molecule level where the signal is dim and comparable to the background noise of the detector. A sufficiently low-noise detector detects light from approximately one enzyme and characterizes the emission in real time. Since each enzyme can emit one single photon at the time, we can directly verify that our detection capabilities enable light detection from a single enzyme molecule using the statistical properties of single-photon-emitters.

Quantum mechanically, the second-order correlation function $g^{(2)}(\tau)$ is defined as $$g^{(2)}(\tau) = \frac{\langle \hat{a}^+(t)\hat{a}^+(t+\tau)\hat{a}(t+\tau)\hat{a}(t)\rangle}{\langle \hat{a}^+(t)\hat{a}(t)\rangle^2}, \quad (1)$$

where $\hat{a}$, $\hat{a}+$ are creation and annihilation operators. In classical optics, this equation becomes:

$$g^{(2)}(\tau) = \frac{\langle I(t)I(t+\tau)\rangle}{\langle I(t)\rangle^2}, \quad (2)$$

where I(t) is the intensity of the field at time t and the brackets indicates the average over the detected time interval. If we consider a coherent source with time independent intensity $I_0$ we would have that $g^{(2)}(\tau)=I_0^2/I_0^2=1$ for any value of $\tau$. It can be shown that a classical source with time-dependent intensity will yield $g^{(2)}(\tau)>1$, thus all classical light sources are constrained by $g^{(2)}(\tau)\geq 1$.

Quantum mechanically, $\hat{a}$, $\hat{a}+$ do not commute, so an expression analogous to Eq. 2 cannot be written. However, in a special case of $\tau=0$ there is a simpler form for $g^{(2)}(0)$:

$$g^{(2)}(0) = \frac{\langle \hat{n}(t)(\hat{n}(t)-1)\rangle}{\langle \hat{n}(t)\rangle^2}, \quad (3)$$

where $\hat{n}(t)=\hat{a}+(t)\hat{a}(t)$ is a photon-number operator. This form allows a useful physical interpretation. Because single emitters can only emit one photon at a time (a Fock state |1⟩), $\hat{n}(t)$ can only be 0 or 1, and $\hat{n}(t)(\hat{n}(t)-1)=0$. Therefore for such a source, $g^{(2)}(0)=0$, in a stark contrast with the classical case. Therefore, from the first principles of quantum mechanics, a measurement $g^{(2)}(0)=0$ gives the absolute proof that the source is a single photon source. It can be shown that for N participating emitters, $g^{(2)}(0)=1-1/N<1$, which provides an independent scale to figure out the number of participating emitters. Notice that the $g^{(2)}$ measurement is resilient to loss since an undetected photon does not contribute to either the denominator or numerator of 3. When the number of emitters increases, $g^{(2)}(0)$ asymptotically reaches one. Hence, the quantitative measurements of the number of emitters using this parameter are most accurate for low N.

Enzymes as Single Photon Sources

The second-order autocorrelation function, $g^{(2)}(\tau)$, is the joint probability of detecting a photon at time t=0 and a subsequent photon at a later time t=$\tau$. The characteristic dip of a $g^{(2)}(\tau)$ measurement from a single emitter is due to the fact that after excitation the emitter needs to be excited again, hence it cannot immediately emit a subsequent photon.

In some isolated single emitter systems, like quantum dots, the width of a $g^{(2)}(\tau)$ dip is related to pumping rate and the excited state lifetime. The kinetics of a bioluminescent process is more complicated. The enzyme is believed to catalyze oxidation of just one molecule at a time. The "inactive" time between one photon emission and the next is determined by the time required by the enzyme to reach its steady-state after a successful catalysis event. A catalysis event was successful because a photon associated with it was detected (at t=0). The inactive time depends on characteristic times of several relevant processes. These processes include (but may not be limited to) turnover time, characteristic association time and dissociation time. In canonical (and classical) Michaelis-Menten kinetics model these times are derived from kinetic constants (or rates) and enzyme, substrate concentrations. In this model, the rate of change between different states of the enzyme (free enzyme, enzyme associated with a substrate, enzyme associated with the product of chemical reaction, etc) is described by the so-called kinetic rates k. However, by observing the ensembles of enzyme, only some rates can be characterized in absolute units, while other rates can be only found in relative units, i.e. as ratios of certain kinetic rates. Here we assume for simplicity that the permanent inactivation of the enzyme is unlikely. We also assume that the random association of the enzyme with the product molecule (oxidized substrate) is negligible. For a single enzyme molecule we write:

$$\begin{cases} \frac{dE}{dt} = -k_S^{on} \cdot S \cdot E + k_P^{off} \cdot EP + k_S^{off} \cdot ES \\ \frac{dES}{dt} = k_S^{on} \cdot S \cdot E - (k_{cat} + k_S^{off}) \cdot ES - k_{SS}^{on} \cdot S \cdot ES + k_{SS}^{off} \cdot ESS \\ \frac{dEP}{dt} = k_{cat} \cdot ES(t) - k_P^{off} \cdot EP \\ \frac{dESS}{dt} = k_{SS}^{on} \cdot S \cdot ES - k_{SS}^{off} \cdot ESS \end{cases}$$

where S is the concentration of substrate, and E, ES, ESS, EP are probabilities of an enzyme to be in a free state (i.e. not associated with either enzyme or product), associated to one substrate molecule, associated to two substrate molecules and associated to the product (oxidized substrate), respectively. In addition, E+ES+ESS+EP=1. The kinetic constants k describe rates of change of enzyme states, where "on" describe association, "off" describe dissociation, subindexes S, SS, P refer to transitions between ES and E states, transitions between ESS and ES states, and transitions between EP and E states, respectively. Note that association, dissociation processes do not cause a chemical reaction. Finally, subindex cat refers to rate of catalysis, i.e. the rate of the chemical reaction catalyzed by the enzyme. concentrations of free enzyme and substrate, respectively, [ES] and [ESS] are concentrations of the enzyme bound to one and two substrate molecules, respectively, k are specific kinetic constants that describe binding, unbinding, inactivation, and the catalytic rate.

Although the solution to the system of differential equations above can be found using computer methods, we find a simplified analytical solution, where we neglect the ES to ESS transition. It can be shown that $$g^{(2)}(t) = 1 + \frac{(\Gamma - \sqrt{\lambda})e^{\frac{1}{2}t(-\Gamma-\sqrt{\lambda})}}{2\sqrt{\lambda}} - \frac{(\Gamma + \sqrt{\lambda})e^{\frac{1}{2}t(\sqrt{\lambda}-\Gamma)}}{2\sqrt{\lambda}}$$

where $$\lambda = 2Sk_S^{on}\left(-k_{cat} - k_P^{off} + k_S^{off}\right) + \left(k_{cat} - k_P^{off} + k_S^{off}\right)^2 + S^2(k_S^{on})^2$$

$$\Gamma = k_{cat} + k_P^{off} + k_S^{off} + Sk_S^{on}$$

$$k_{cat} \ll k_S^{off}$$

$$k_{cat} \ll k_P^{off}$$

$$g^{(2)}(t) = 1 - \frac{k_P^{off} e^{-t\left(k_S^{off} + Sk_S^{on}\right)}}{k_P^{off} - k_S^{off} - Sk_S^{on}} + \frac{\left(k_S^{off} + Sk_S^{on}\right)e^{-tk_P^{off}}}{k_P^{off} - k_S^{off} - Sk_S^{on}}$$

Further simplification is possible if we can further assume that the rate of enzyme-product dissociation is either significantly higher (lover) than the rates of association/dissociation with the substrate:

$$g^{(2)}(t) \stackrel{k_P^{off} \gg \left(k_S^{off} + Sk_S^{on}\right)}{=} 1 - e^{-t\left(k_S^{off} + Sk_S^{on}\right)}$$

$$g^{(2)}(t) \stackrel{k_P^{off} \ll \left(k_S^{off} + Sk_S^{on}\right)}{=} 1 - e^{-tk_P^{off}}$$

The EP state is often omitted in calculations. While this can be $$k_P^{off} \gg k_{cat}$$

$$g^{(2)}(t) = 1 - e^{-t\left(k_S^{off} + Sk_S^{on} + k_{cat}\right)}$$

Equations (6), (7) can be directly compared to a two-level quantum emitter transient behavior after emitting a photon:

$$g^{(2)}(t) = 1 - e^{-t/T}, \quad (8)$$

where T is the transient time. Therefore, we arrive at a rather counterintuitive (for quantum optics) result that the transient time for an enzyme does not depend on the rate of photon emission, as would be the case for an optically-pumped two-level system. Even absent the approximations above, equations (4) introduce a new relation between the kinetic parameters that can only be measured by observing the quantum transient effect.

One can observe the $g^{(2)}(0)<1$ so that absolute quantum calibration and determination of the number of emitters are possible.

Hardware Configuration

Figure 9:
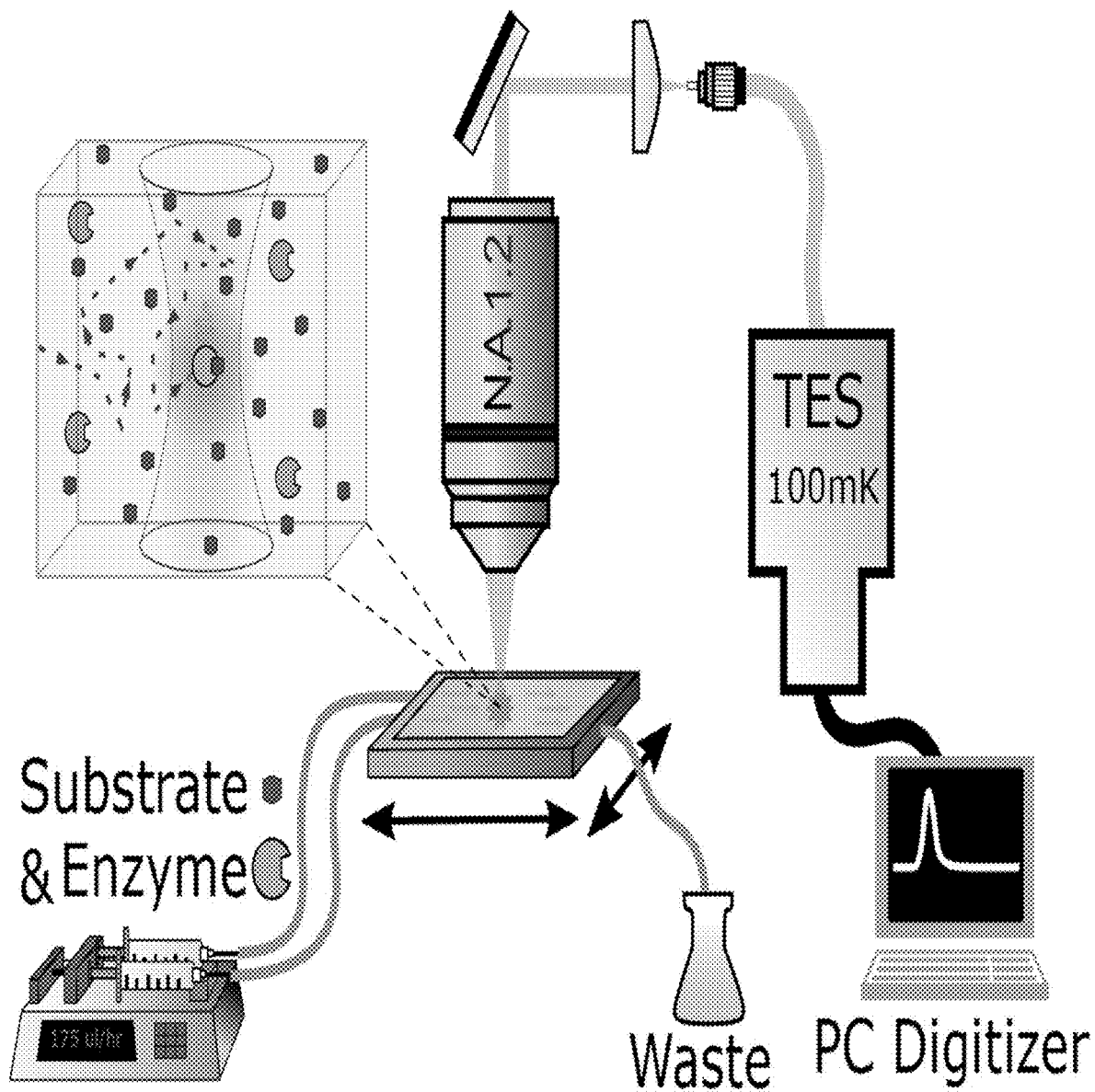
FIG. 9 shows an experimental configuration of a bioluminescent single photon bioreactor according to the Example.

An exemplary hardware configuration is shown in FIG. 9. The nanoluc/furimazine assay was performed. We prepared a dilution of nanoluc in phosphate-buffered saline solution (PBS) to a concentration of ~0.2 enzymes per 0.1 fL. We used nanoluc enzyme. We used furimazine as the substrate. For furimazine, we prepared a 1:20 dilution with the provided buffer solution, nanoglo. We then separately loaded the enzyme dilutions and their respective substrates into a pair of syringes and pushed them into a fluidic channel where the contents mix and catalysis occurs. The flow rate was set to 2.9 µl/s to replenish the volume of the flow cell and sustain the reaction for several hours. The emitted photons were collected by an inverted confocal microscope using a 60× oil immersion objective lens with a numerical aperture of 1.25 and guided into a single mode fiber for 780 nm. Photons were detected using a transition edge sensor (TES) cooled below 100 mK. We use a custom-built TES. For each photodetection event the TES outputs a signal that is amplified by superconducting and room temperature amplifiers and digitized. The digitizer records digital waveforms of a certain length every time when the measured signal crosses a pre-set voltage threshold. These waveforms are stored for analysis.

We repeated the same experiment with the weak laser source with comparable photon flux as the input to the TES.

When noise is present, the noise usually adds an uncorrelated component to photon number statistics. To use the method above, the signal to noise ratio should be sufficiently high. In an optically background-free environment, such us a bioluminescent one, the most significant noise component is dark noise of a detector. For example, many avalanche photodiodes (APD) have a dark count rate in the order of 10s to 100s counts per second, a $g^{(2)}(\tau)$ measurement with signals significantly lower than that would be impossible. A transition edge sensor (TES) is a photon counting detector that has almost zero dark counts and in some cases has the ability of performing photon number resolved measurements. The TES outputs a continuous electrical signal whose voltage is proportional to its temperature. The temperature change due to an absorption of a photon is detected as a voltage impulse. Each detection corresponds to an impulse with a certain duration and a certain amplitude. The duration and the amplitude in general depend on a wavelength and the number of photons that are simultaneously detected. The detection time of a photon is the time when a leading edge of the impulse crosses a certain threshold. The intrinsic dark noise of the TES detector is very low. The main sources of noise in the detection system are: the electronic amplifier noise, cosmic rays, and the noise from background blackbody radiation that couples to the TES through the input fiber. In our case here the approximate wavelength is known, so we obtain the typical waveform response from the TES and reject significantly different events to reduce electronic noise of the detection system. Most of these events result in waveforms that are significantly different by shape, amplitude and length from photon detection in our wavelength range. We apply minimal and maximal amplitude and pulse length filters to reject the outlier events. After outlier event rejection, in our estimation, we collect less than 1 event in 5 minutes that can still be attributed to background noise. This noise is approximately 3 orders of magnitude smaller than the signal, therefore in this demonstration we don't have to apply noise corrections to the $g^{(2)}$ measurements.

Ideally, to measure the autocorrelation function $g^{(2)}$ one identifies timestamps of photon detection times. Then, one defines a time interval $\Delta\tau$ for accumulating the coincidences. A zero-delay coincidence occurs when the time interval between the two arrival times is less than $\Delta\tau$. An N-delay coincidence occurs when the time interval between the two arrival times is longer than $(N-1)\Delta\tau$ but less than $N\Delta\tau$. In our case, we cannot rely on the photon number resolving ability of the detector, so we find the shortest possible time delay between the two resolvable photon detections $\Delta\tau_0$. Thus, in our experiment a zero delay coincidence occurs when the time interval between the two arrival times is more than $\Delta\tau_0$ and less than $\Delta\tau+\Delta\tau_0$. An N-delay coincidence occurs when the time interval between the two arrival times is longer than $N\Delta\tau+\Delta\tau_0$ but less than $(N+1)\Delta\tau+\Delta\tau_0$. N is an integer. To recognize this important difference we label the measured correlation function $\Gamma^{(2)}$. This operational method gives the values without a normalization. Before discussing a proper normalization, note that, formally, $\Gamma^{(2)}(N) = \int_{\Delta\tau_0+\Delta\tau N}^{\Delta\tau_0+\Delta\tau(N+1)} g^{(2)}(\tau)d\tau/\Delta\tau$. Further, note that $\Gamma^{(2)}(0) \geq g^{(2)}(0)$, because $g^{(2)}(\tau) \geq 0$.

The measured value $\Gamma^{(2)}$ needs to be normalized. To provide normalization, we note that $\Gamma^{(2)}(N)$ reaches a maximum and flattens out in an experiment for sufficiently large N. We use sufficiently large $N_A$ and $N_B$ values where there is no statistically significant dependence of $\Gamma^{(2)}(N)$ on N. Operationally, $N_A$ and $N_B$ cannot be too large to avoid classical correlation effects due to instabilities in the system, some of which are inherent to the system studied. This corresponds to large times when the enzymatic reaction reaches the steady-state after a photon is detected. The transient effects prevent the enzyme to immediately associate with substrate and emit light and lead to the nonclassical character of photon emission.

The transient can be understood using a single two-level system as an underlying example. In this system, $g(2)(\tau) = 1 - \exp(-\tau/T)$ where T is the transient time. Substituting this anzats into the formula for the observed $\Gamma^{(2)}(N)$ establishes the relation of the transient time and the nonclassical observations.

The enzyme's position is not controlled, but data suggests that an active enzyme is not moving freely but rather is stuck to the glass plate. At time intervals N chosen for the analysis we do not observe the classical "blinking" feature associated with the transit time of the emitter across the focal volume in our correlation experiment, as intended.

Because transient time intervals with nonclassical statistics are significantly shorter than the average interarrival times of detected photons the data needs to be collected for a few hours (e.g., about 80 hours).

Results and Discussion

Figure 10:
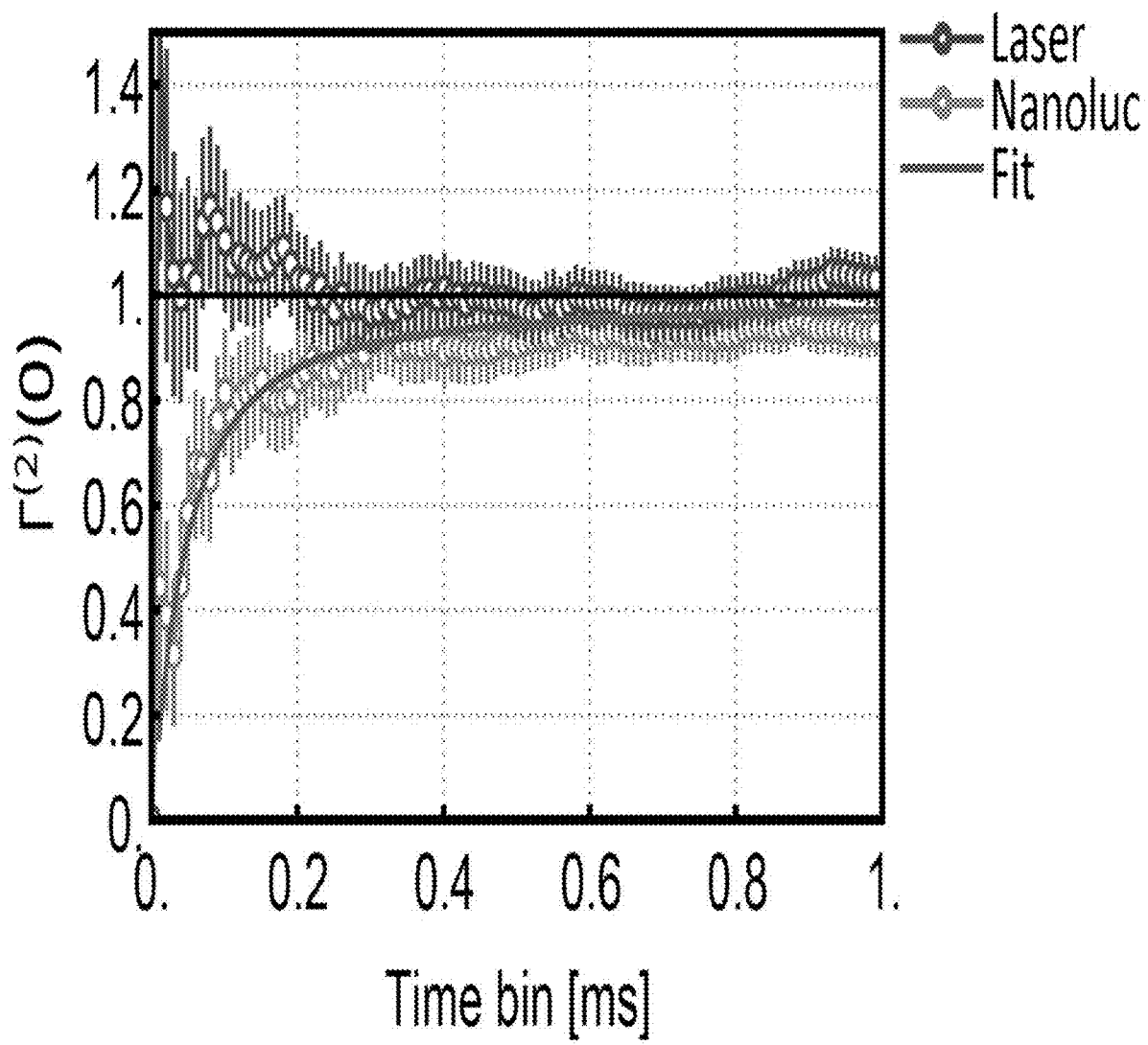
FIG. 10 shows a graph of second-order correlation function $\Gamma^{(2)}(0)$ versus time bin size $\Delta\tau$ according to the Example.

Based on the recorded data, $\Gamma^{(2)}(0)$ was measured as a function of $\Delta\tau$ using the method described above. Results are shown in FIG. 10. From this data, light fields emitted by both bioluminescent processes are nonclassical ($\Gamma^{(2)} < 1$ over a range of $\Delta\tau$). For Nanoluc, $\Gamma^{(2)}(0) = 0.3(1)$ is less than the nonclassicality threshold of unity, corresponding to p-value of less than $10^{-3}$. In addition, T=0.018 ms from the fitted data. The singles rate is about 2-4 counts per second, consistent with the turnover rate of the nanoluc/furimazine reaction and coupling and detection losses.

We also performed analysis with data collected from the laser attenuated to the same photon rate as bioluminescent samples and obtain an expected value $\Gamma^{(2)}(0)=1$, as in FIG. 10.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more general purpose computers or processors. The code modules may be stored in any type of non-transitory computer-readable medium or other computer storage device. Some or all the methods may alternatively be embodied in specialized computer hardware. In addition, the components referred to herein may be implemented in hardware, software, firmware, or a combination thereof.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

Any illustrative logical blocks, modules, and algorithm elements described in connection with the embodiments disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The process descriptions, elements or blocks in flow diagrams described herein or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix (s) as used herein is intended to include both the singular and the plural of the term that it modifies, thereby including at least one of that term (e.g., the colorant(s) includes at least one colorants). Option, optional, or optionally means that the subsequently described event or circumstance can or cannot occur, and that the description includes instances where the event occurs and instances where it does not. As used herein, combination is inclusive of blends, mixtures, alloys, reaction products, collection of elements, and the like.

As used herein, a combination thereof refers to a combination comprising at least one of the named constituents, components, compounds, or elements, optionally together with one or more of the same class of constituents, components, compounds, or elements.

All references are incorporated herein by reference.

The use of the terms "a," "an," and "the" and similar referents in the context of describing the invention (especially in the context of the following claims) are to be construed to cover both the singular and the plural, unless otherwise indicated herein or clearly contradicted by context. It can further be noted that the terms first, second, primary, secondary, and the like herein do not denote any order, quantity, or importance, but rather are used to distinguish one element from another. It will also be understood that, although the terms first, second, etc. are, in some instances, used herein to describe various elements, these elements should not be limited by these terms. For example, a first current could be termed a second current, and, similarly, a second current could be termed a first current, without departing from the scope of the various described embodiments. The first current and the second current are both currents, but they are not the same condition unless explicitly stated as such.

The conjunction or is used to link objects of a list or alternatives and is not disjunctive; rather the elements can be used separately or can be combined together under appropriate circumstances. Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

The modifier about used in connection with a quantity is inclusive of the stated value and has the meaning dictated by the context (e.g., it includes the degree of error associated with measurement of the particular quantity).

What is claimed is:

1. A method implemented by a system of one or more processors, the system being included in a bioluminescent single photon bioreactor and for performing absolute quantification of light-producing activity by enzymes by the bioluminescent single photon bioreactor, the method comprising:
producing, by a pixel detector of the bioluminescent single photon bioreactor, a detector signal;
receiving, by an analyzer of the bioluminescent single photon bioreactor, the detector signal;
determining, by the bioluminescent single photon bioreactor, a time of arrival of the detector signal;
determining, by the bioluminescent single photon bioreactor, an autocorrelation among detector signals for threshold times of arrival of photons at pixel detector according to:
the following equation for a single emitter in the field of view of an objective of the bioluminescent single photon bioreactor:

$$g^{(2)}(\tau) = 1 - e^{-\frac{\tau}{T}}, \text{ or}$$

$g^{(2)}(0)$ for the number of emitters N in the field of view (FOV) of the objective, such that:
if $g^{(2)}(0)$ is 0, then one enzyme was in the field of view; and
if $g^{(2)}(0)$ is not 0, then the number of emitters N is greater than 1, or noise is present in the detector signal.

2. The method of claim 1, further comprising:
receiving, by a bioreactor of the bioluminescent single photon bioreactor, the enzyme at a selected concentration;
receiving, by the bioreactor, a substrate;
catalysing a bioreaction involving the substrate and the enzyme in the bioreactor;
producing a bioluminescent light by the bioreaction;
collecting, by the confocal optical module, the bioluminescent light from the bioreactor;
communicating the bioluminescent light from the confocal optical module to the pixel detector; and detecting, by the pixel detector, the bioluminescent light from the confocal optical module prior to producing, by the pixel detector, the detector signal.

3. The method of claim 1, further comprising measuring the second-order autocorrelation function $g^{(2)}$ by:
identifying timestamps of photon detection times; and
defining a time interval $\Delta T$ for accumulating coincidences.

4. The method of claim 2, wherein the enzyme is immobilized to a portion of the bioreactor not to move freely through the bioreactor.

5. The method of claim 2, wherein the enzyme flows into the bioreactor from an enzyme supply and flows through the bioreactor in absence of immobilization to the bioreactor.

6. The method of claim 1, further comprising:
receiving a fluorophore compound comprising the enzyme in the bioreactor;
receiving excitation light by the fluorophore compound in the bioreactor;
producing fluorescent light by the fluorophore compound in response to receipt of the excitation light;
communicating the fluorescent light from the bioreactor to the confocal optical module;
communicating the fluorescent light from the confocal optical module to the pixel detector; and
detecting the fluorescent light from the confocal optical module by the pixel detector, such that the detector signal further comprises components due to the fluorescent light.

7. Non-transitory computer storage media storing instructions for execution by a system of one or more processors, the system being included in a bioluminescent single photon bioreactor, and the instructions causing the one or more processors to perform operations comprising: producing, by a pixel detector of the bioluminescent single photon bioreactor, a detector signal; receiving, by an analyzer of the bioluminescent single photon bioreactor, the detector signal; determining, by the bioluminescent single photon bioreactor, a time of arrival of the detector signal; determining, by the bioluminescent single photon bioreactor, an autocorrelation among detector signals for threshold times of arrival of photons at pixel detector according to: the following equation for a single emitter in the field of view of an objective of the bioluminescent single photon bioreactor:

$$g^{(2)}(\tau) = 1 - e^{-\frac{\tau}{T}}, \text{ or}$$

$g^{(2)}(0)$ for the number of emitters N in the field of view (FOV) of the objective, such that: if $g^{(2)}(0)$ is 0, then one enzyme was in the field of view; and if $g^{(2)}(0)$ is not 0, then the number of emitters N is greater than 1, or noise is present in the detector signal.

8. The computer storage media of claim 7, further comprising:
receiving, by a bioreactor of the bioluminescent single photon bioreactor, the enzyme at a selected concentration;
receiving, by the bioreactor, a substrate;
catalysing a bioreaction involving the substrate and the enzyme in the bioreactor;
producing a bioluminescent light by the bioreaction;
collecting, by the confocal optical module, the bioluminescent light from the bioreactor;
communicating the bioluminescent light from the confocal optical module to the pixel detector; and
detecting, by the pixel detector, the bioluminescent light from the confocal optical module prior to producing, by the pixel detector, the detector signal.

9. The computer storage media of claim 8, further comprising measuring the second-order autocorrelation function $g^{(2)}$ by:
identifying timestamps of photon detection times; and
defining a time interval $\Delta T$ for accumulating coincidences.

10. The computer storage media of claim 8, wherein the enzyme is immobilized to a portion of the bioreactor not to move freely through the bioreactor.

11. The computer storage media of claim 8, wherein the enzyme flows into the bioreactor from an enzyme supply and flows through the bioreactor in absence of immobilization to the bioreactor.

12. The computer storage media of claim 8, further comprising:
receiving a fluorophore compound comprising the enzyme in the bioreactor;
receiving excitation light by the fluorophore compound in the bioreactor;
producing fluorescent light by the fluorophore compound in response to receipt of the excitation light;
communicating the fluorescent light from the bioreactor to the confocal optical module;
communicating the fluorescent light from the confocal optical module to the pixel detector; and
detecting the fluorescent light from the confocal optical module by the pixel detector, such that the detector signal further comprises components due to the fluorescent light.

\* \* \* \* \*